United States Patent

Weksler et al.

(10) Patent No.: US 7,782,201 B2
(45) Date of Patent: Aug. 24, 2010

(54) TECHNIQUES FOR PREVENTING DAMAGE TO A PORTABLE DEVICE

(75) Inventors: Arnold S. Weksler, Raleigh, NC (US);
Scott E. Kelso, Durham, NC (US);
Nathan J. Peterson, Raleigh, NC (US);
Rod D. Waltermann, Rougemont, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 274 days.

(21) Appl. No.: 12/028,556

(22) Filed: Feb. 8, 2008

(65) Prior Publication Data

US 2009/0201164 A1  Aug. 13, 2009

(51) Int. Cl.
*G08B 13/14* (2006.01)
(52) U.S. Cl. .............. 340/568.1; 340/568.2; 340/539.1; 340/539.11; 340/541; 340/571; 340/669; 340/687

(58) Field of Classification Search ................. 340/669, 340/568.1, 568.2, 568.3, 539.1, 539.11, 541, 340/686.1, 686.4, 571, 687; 342/357.01, 342/357.08; 701/207, 220
See application file for complete search history.

(56) References Cited

U.S. PATENT DOCUMENTS

| 6,037,748 | A  | * | 3/2000  | Yee et al. | ..................... 320/127 |
| 6,542,824 | B1 | * | 4/2003  | Berstis    | ....................... 701/220 |
| 6,970,095 | B1 | * | 11/2005 | Lee et al. | ..................... 340/669 |
| 7,135,971 | B2 | * | 11/2006 | Kim        | ....................... 340/568.1 |
| 2002/0121976 | A1 | * | 9/2002 | Huang      | ....................... 340/571 |

* cited by examiner

*Primary Examiner*—Hung T. Nguyen
(74) *Attorney, Agent, or Firm*—Antony P. Ng; Dillon & Yudell LLP

(57) ABSTRACT

A technique for preventing damage to a portable device includes detecting movement of a portable device and determining whether a port of the portable device is attached to an external device. When the external device is attached to the port, a notification is provided to a user of the portable device that the external device requires detachment from the portable device (e.g., assuming that the notification is not masked).

20 Claims, 2 Drawing Sheets

TECHNIQUES FOR PREVENTING DAMAGE TO A PORTABLE DEVICE

BACKGROUND

1. Field

This disclosure relates generally to a portable device and, more specifically, to techniques for preventing damage to a portable device.

2. Related Art

Today, the use of portable devices (such as notebook computer systems, laptop computer systems, personal digital assistants (PDAs), and mobile telephones) is ubiquitous in both homes and businesses. Typically, a portable device includes a power adapter port for connecting the device to an AC power source (via an AC/DC converter) and a number of device ports that allow the portable device to be attached to a number of peripheral devices. Today, many portable devices incorporate plug and play functionality, which allows connection of a new device to a computer system without requiring reconfiguration (or manual installation of device drivers). Plug-and-play functionality includes hot plugging which is applicable to devices that implement universal serial bus (USB) and IEEE 1494 technologies. In general, hot plugging refers to the ability to remove and replace components of a machine, such as a computer system, while the machine is operating. When appropriate software is installed on a hot plug enabled computer system, a user can plug and unplug components without rebooting the computer system.

Hot plug technology has become commonplace in recent years and, today, even low-end computer systems usually support hot plugging (or hot swapping). Hot swap devices include USB memory keys (flash drives), hard drives, peripheral component interface extended (PCI-X) expansion cards, personal computer memory card international association (PCMCIA) cards (or PC-cards), some power supplies, and certain processors. In general, a machine that supports hot swapping is capable of detecting that a device has been attached/detached to/from the machine. Electrical and mechanical connectors of a hot swap capable machine are usually designed such that a device and a user are not harmed by connecting/disconnecting the device to/from the machine. In some contexts, the term 'hot swapping' refers only to the ability to add or remove hardware without powering down the system, while in other contexts the term 'hot swapping' refers to an ability of a machine to autonomously detect when hardware is added or removed. In the former case, one can add or remove hardware without powering down, but system software may have to be notified when new hardware is added to a system in order for the system to use the new hardware (frequently referred to as 'cold plugging'). Examples of the cold plugging technologies include RS-232 and lower-end small computer system interface (SCSI) devices, while examples of hot plugging technologies include USB, IEEE 1394, and higher-end SCSI devices.

In computer hardware, a 'port' serves as a connection point between the computer and other devices. Physically, a hardware port is a specialized outlet to which a plug or cable connects. Hardware ports may be male (unusual, as protruding pins easily break) or female (typical). Hot-pluggable ports can be connected while equipment is powered and running. About the only port on a typical conventional personal computer (PC) that is not hot-pluggable is a legacy personal system/2 (PS/2) connector. Hot-plugging a PS/2 keyboard into a PS/2 port of a computer can cause permanent damage to a motherboard of the computer. Plug-and-play ports are generally designed so that connected devices automatically begin handshaking upon connection completion. Auto-detect ports, such as plug-and-play ports, may automatically determine what kind of device has been attached and a purpose of the port. Some auto-detect ports can even switch between input and output based on context.

A port may be coupled to a device through a number of different technologies (such as metal conductors, optical fiber, microwave, etc.). Devices that attach to a USB port can be custom devices (which require a custom device driver), or may belong to a device class, which defines an expected behavior in terms of device and interface descriptors, such that the same device driver may be used for any device that is a member of the device class. In general, an operating system (OS) should implement all USB device classes so as to provide generic drivers for any USB device.

SUMMARY

According to one aspect of the present disclosure, a technique for preventing damage to a portable device includes detecting movement of a portable device and determining whether a port of the portable device is attached to an external device. When the external device is attached to the port, a notification is provided to a user of the portable device that the external device requires detachment from the portable device (e.g., assuming the notification is not masked).

According to another aspect of the present disclosure, a portable device (e.g., a notebook computer system, a laptop computer system, a personal digital assistant (PDA), or a mobile telephone) includes an accelerometer (single or multi-axis) and a processor coupled to the accelerometer. The processor is configured to detect movement of the portable device (based on output provided by the accelerometer) and determine whether a port of the portable device is attached to an external device. The processor is also configured to provide a notification to a user of the portable device that the external device requires detachment from the portable device, when the external device is attached to the port (e.g., assuming the notification is not masked).

BRIEF DESCRIPTION OF THE DRAWINGS

The present invention is illustrated by way of example and is not intended to be limited by the accompanying figures, in which like references indicate similar elements. Elements in the figures are illustrated for simplicity and clarity and have not necessarily been drawn to scale.

DETAILED DESCRIPTION

As will be appreciated by one of ordinary skill in the art, aspects of the present invention may be embodied as a method, system, device, or computer program product. Accordingly, the present invention may take the form of an entirely hardware embodiment, an entirely software embodiment (including firmware, resident software, microcode, etc.) or an embodiment combining software and hardware aspects that may all generally be referred to herein as a circuit, module, or system.

Any suitable computer-usable or computer-readable storage medium may be utilized. The computer-usable or computer-readable storage medium may be, for example, but is not limited to an electronic, magnetic, optical, electromagnetic, infrared, or semiconductor system, apparatus, or device. More specific examples (a non-exhaustive list) of the computer-readable medium includes the following: a portable computer diskette, a hard disk, a random access memory (RAM), a read-only memory (ROM), an erasable programmable read-only memory (EPROM) or flash memory, a portable compact disc read-only memory (CD-ROM), an optical storage device, or a magnetic storage device. Note that the computer-usable or computer-readable storage medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this disclosure, a computer-usable or computer-readable storage medium may be any medium that can contain or store a program for use by or in connection with an instruction execution system, apparatus, or device. As used herein, the term "coupled" includes both a direct electrical connection between blocks or components and an indirect electrical connection between blocks or components achieved using intervening blocks or components. The term "portable device," as used herein, includes devices, such as desktop computer systems, that are not normally considered portable.

Figure 1:
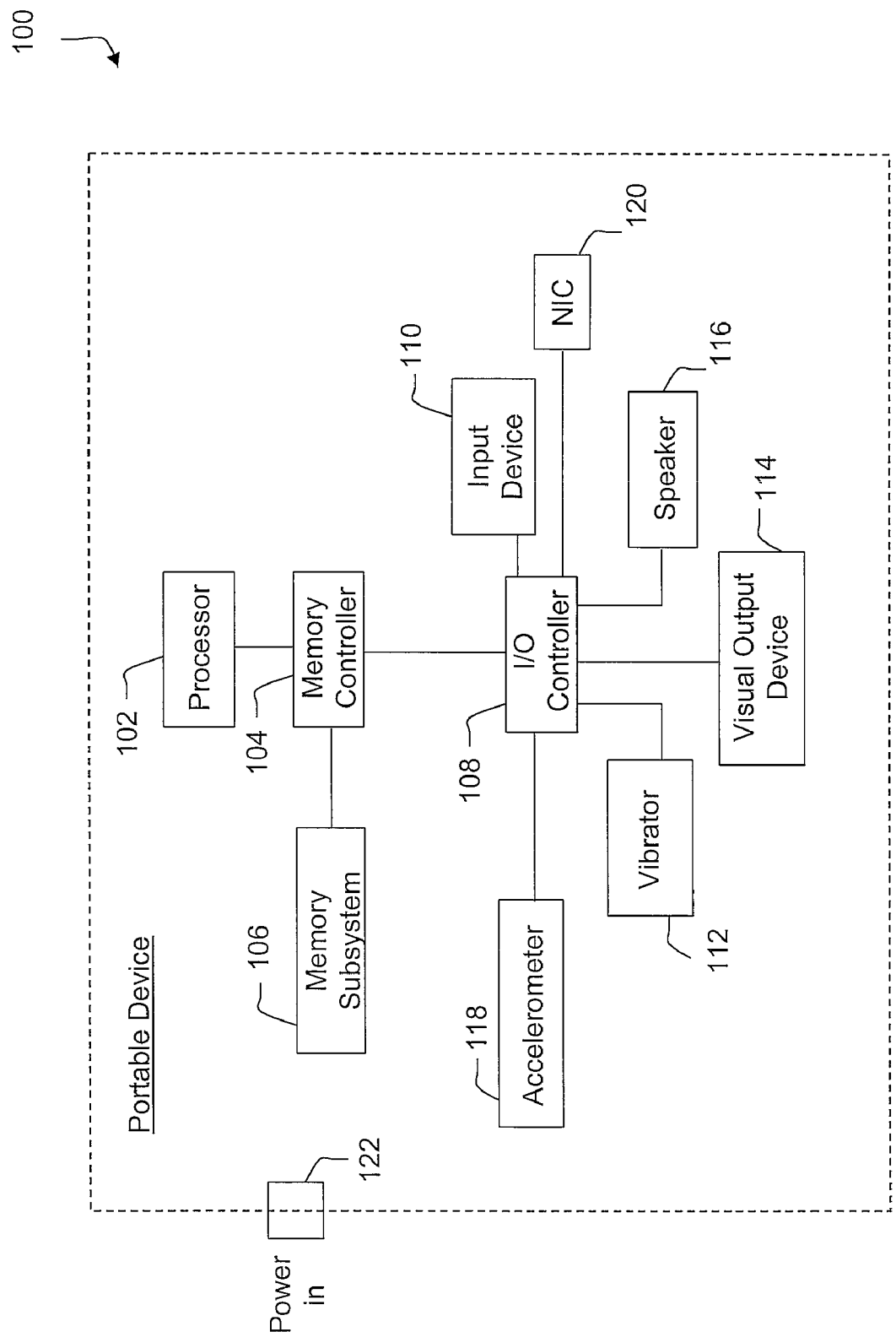
FIG. 1 is a block diagram of a relevant portion of an example portable device that is configured to provide a notification to a user of the device to prevent damage to the device (and/or an associated cable), according to various embodiments of the present disclosure.

With reference to FIG. 1, an example portable device 100 is illustrated that may be configured prevent damage to a port (and/or a cable associated with the port) according to various embodiments of the present disclosure. The port may be, for example, a USB port, a IEEE 1394 port, a PS/2 port, a power-in port, or a network (e.g., Ethernet) port, a parallel port, a video port, or another serial port, among other ports. The device 100 may be, for example, a computer system. The device 100 includes a processor 102 that is coupled to a memory controller 104, which is coupled to a memory subsystem 106 and an input/output (I/O) controller 108. As is illustrated, the I/O controller 108 is coupled to an input device 110, a vibrator 112, a visual output device 114, a speaker 116, an accelerometer 118, and a network interface controller (NIC) 120. The processor 102 may include one or more processor cores and one or more levels of cache. The memory subsystem 106 includes an application appropriate amount of volatile memory (e.g., dynamic random access memory (DRAM)) and non-volatile memory (e.g., read-only memory (ROM)). The input device 110 may include, for example, a mouse and a keyboard. The visual output device 114 may be, for example, a cathode ray tube (CRT), a liquid crystal display (LCD), or a light emitting diode (LED). The processor 102 may also be coupled to one or more mass storage devices (not shown), e.g., a compact disc read-only memory (CD-ROM) drive, via a port. As is illustrated, the device 100 also includes a power-in port 122 for receiving a power adapter cable or an AC power cable. It should be appreciated that the techniques disclosed herein are broadly applicable to devices that may only be able to provide one or two notification types.

Figure 2:
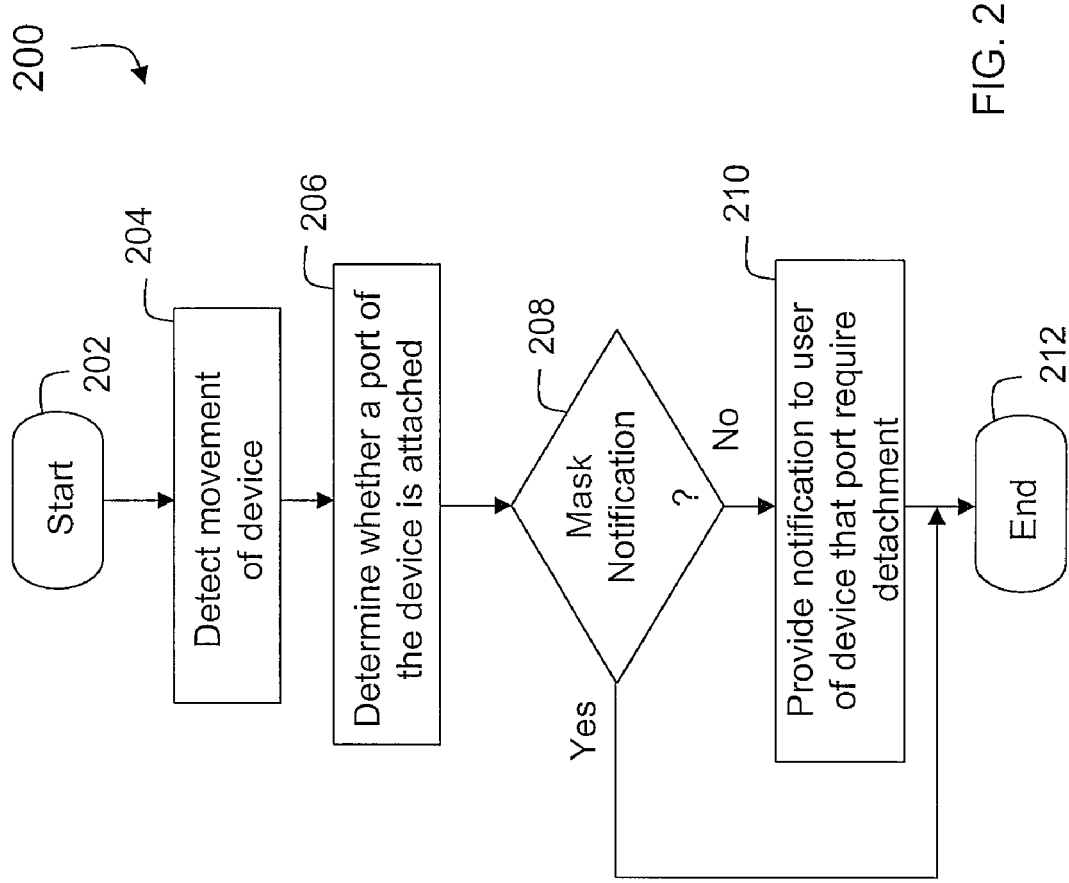
FIG. 2 is a flowchart of a process for preventing damage to a port (and/or associated cable) of the device of FIG. 1, according to an embodiment of the present disclosure.

With reference to FIG. 2, an example process 200 for preventing damage to a port (and/or a cable associated with the port) of a portable device, according to an embodiment of the present disclosure, is illustrated. In block 202, the process 200 is initiated at which point control transfers to block 204. In block 204, the processor 102 detects movement of the device 100 based on output from the accelerometer 118. The accelerometer 118 may be, for example, a single or multi-axis accelerometer or may be replaced with another type of device that provides a movement indication. In a typical implementation, a predetermined threshold is applied to the output received from the accelerometer 118 to determine what action, if any, to take (in this manner minor movement of the device 100 may be ignored).

Next, in block 206, the processor 102 determines whether an external device (e.g., a printer) is coupled to a port (e.g., a USB port or a parallel port) of the device 100. For example, when the external device is a hot plug device (e.g., a USB printer), the processor 102 may automatically detect when the hot plug device is disconnected from the device 100. Next, in decision block 208, the processor 102 determines whether to mask a notification. For example, assuming the external device is a USB memory key (flash drive), the processor 102 may determine that no connectors associated with the port will be damaged if the device 100 is moved. Alternatively, a notification may be masked based on input received by the device 100 from a user. For example, a user may choose to mask notifications based on a specific device or a device class.

In the event that the processor 102 determines that a notification should be masked, control transfers to block 212 where the process 200 terminates until movement of the device 100 is again detected. In the event that the processor 102 determines that a notification should not be masked, control transfers to block 210, where the processor 102 provides a notification to a user of the device 100 that the device 100 should not be moved until a cable (or cables) associated with the port are disconnected. The notification (or notifications) may be a vibrational output (provided via the vibrator 112), a visual output (provided via the visual output device) 114, or an audible output (provided via the speaker 116), or a predetermined combination thereof. Following block 210, control transfers to block 212.

Accordingly, techniques have been disclosed herein that readily facilitate preventing damage to a port (or an associated cable) of a portable device that is being moved by a user of the portable device.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to preferred embodiments thereof, it will be apparent that modifications and variations are possible without departing from the scope of the invention defined in the appended claims.

What is claimed is:

1. A method of preventing damage to a portable device using a processor, comprising:
    detecting movement of a portable device;
    determining, when movement of the portable device is detected, whether a port of the portable device is attached to an external device; and
    providing a notification to a user of the portable device that the external device requires detachment from the portable device, when movement of the portable device is detected and the port of the portable device is attached to the external device.

2. The method of claim 1, wherein the detecting movement further comprises:
    detecting movement of the portable device based on output provided by an accelerometer associated with the portable device.

3. The method of claim 1, wherein the external device is a plug and play device and the determining whether a port of the portable device is attached to an external device further comprises:
    detecting whether the external device is coupled to the port.

4. The method of claim 1, wherein the providing a notification further comprises:
    providing an audible output, a visual output, or a vibrational output to the user of the portable device to indicate that the external device requires detachment from the portable device.

5. The method of claim 1, wherein the port corresponds to a universal serial bus (USB) port, an IEEE 1394 port, a PS/2 port, power adapter port, or a network port.

6. The method of claim 1, further comprising:
    masking the notification when the external device is a universal serial bus (USB) memory key.

7. The method of claim 1, further comprising:
    masking the notification responsive to input to the portable device from the user.

8. The method of claim 7, wherein the input to the portable device is associated with a device class.

9. The method of claim 7, wherein the input to the portable device is associated with a specific device.

10. A portable device, comprising:
    an accelerometer;
    a processor coupled to the accelerometer, wherein the processor is configured to:
        detect movement of the portable device based on output provided by the accelerometer;
        determine, when movement of the portable device is detected, whether a port of the portable device is attached to an external device; and
        provide a notification to a user of the portable device that the external device requires detachment from the portable device, when movement of the portable device is detected and the port of the portable device is attached to the external device.

11. The portable device of claim 10, wherein the accelerometer is a multi-axis accelerometer and the external device includes a keyboard, a pointing device, an external power supply, or a network, and wherein the portable device is a notebook computer system, a laptop computer system, a personal digital assistant (PDA), or a mobile telephone.

12. The portable device of claim 10, wherein the external device is a plug and play device and the processor is further configured to detect whether the external device is coupled to the port.

13. The portable device of claim 10, wherein the portable device further comprises:
    a speaker coupled to the processor, wherein the processor is further configured to provide an audible warning, via the speaker, to alert a user of the portable device that the external device requires detachment from the portable device.

14. The portable device of claim 10, wherein the portable device further comprises:
    a display coupled to the processor, wherein the processor is further configured to provide a visual warning, via the display, to alert a user of the portable device that the external device requires detachment from the portable device.

15. The portable device of claim 10, wherein the portable device further comprises:
    a vibrator coupled to the processor, wherein the processor is further configured to provide a vibration, via the vibrator, to alert a user of the portable device that the external device requires detachment from the portable device.

16. The portable device of claim 10, wherein the port corresponds to a universal serial bus (USB) port, an IEEE 1394 port, a PS/2 port, power adapter port, or a network port.

17. The portable device of claim 10, wherein the processor is further configured to mask the notification when the external device is a universal serial bus (USB) memory key.

18. The portable device of claim 10, wherein the processor is further configured to mask the notification responsive to input to the portable device from the user.

19. The portable device of claim 18, wherein input to the portable device is associated with a device class or a specific device.

20. A computer system, comprising:
    an accelerometer; a processor coupled to the accelerometer, wherein the processor is configured to:
    detect movement of the computer system based on output provided by the accelerometer;
    determine, when movement of the computer system is detected, whether a port of the computer system is attached to an external device; and
    provide a notification to a user of the computer system that the external device requires detachment from the computer system, when movement of the computer system is detected and the port of the computer system is attached to the external device.

* * * * *